(12) United States Patent
Wang et al.

(10) Patent No.: US 8,091,179 B2
(45) Date of Patent: Jan. 10, 2012

(54) HINGE ASSEMBLY FOR COLLAPSABLE ELECTRONIC DEVICE

(75) Inventors: Jin-Xin Wang, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 338 days.

(21) Appl. No.: 12/472,526

(22) Filed: May 27, 2009

(65) Prior Publication Data

US 2010/0071161 A1      Mar. 25, 2010

(30) Foreign Application Priority Data

Sep. 25, 2008   (CN) .......................... 2008 1 0304655

(51) Int. Cl.
*E05C 17/64*      (2006.01)
(52) U.S. Cl. .......................................... 16/342; 16/338
(58) Field of Classification Search ............. 16/342, 16/337, 338, 341, 349, 252, 253, 2.1; 379/433.13; 455/575.3; 361/679.27
See application file for complete search history.

(56) References Cited

U.S. PATENT DOCUMENTS

| 4,630,333 | A | * | 12/1986 | Vickers | 16/338 |
|---|---|---|---|---|---|
| 5,031,275 | A | * | 7/1991 | Chiang | 16/263 |
| 5,632,066 | A | * | 5/1997 | Huong | 16/338 |
| 6,085,388 | A | * | 7/2000 | Kaneko | 16/338 |
| 6,584,646 | B2 | * | 7/2003 | Fujita | 16/342 |
| 6,826,802 | B2 | * | 12/2004 | Chang | 16/375 |
| 7,895,711 | B2 | * | 3/2011 | Shen | 16/342 |
| 2007/0169314 | A1 | * | 7/2007 | Lee et al. | 16/342 |
| 2007/0192994 | A1 | * | 8/2007 | Chuang | 16/342 |
| 2010/0139034 | A1 | * | 6/2010 | Shen | 16/2.1 |
| 2011/0072620 | A1 | * | 3/2011 | Wang et al. | 16/342 |
| 2011/0099761 | A1 | * | 5/2011 | Wang et al. | 16/339 |

\* cited by examiner

*Primary Examiner* — William L. Miller
(74) *Attorney, Agent, or Firm* — Altis Law Group, Inc.

(57) ABSTRACT

A hinge assembly includes a pivot shaft having a pivot portion, a friction member sleeved on the pivot portion, a support member, and an adjusting member. The pivot shaft includes a pivot portion. The friction member includes a first friction body and a second friction body attached to the first friction body. The support member includes a housing, and defines a receiving chamber in the housing and an adjusting hole communicating with the receiving chamber. The friction member and the pivot portion of the pivot shaft are received in the chamber. An inner wall of the receiving chamber presses the friction member to clamp the pivot portion. The adjusting member is received in the at least one adjusting hole to abut the friction member such that the friction created between the friction member and the pivot portion can be adjusted.

18 Claims, 4 Drawing Sheets

HINGE ASSEMBLY FOR COLLAPSABLE ELECTRONIC DEVICE

BACKGROUND

1. Technical Field

The present disclosure relates to hinge assemblies and, more particularly, to a hinge assembly for a collapsable electronic device.

2. Description of Related Art

A collapsable electronic device, such as a notebook computer or mobile phone generally includes a main body and a cover pivotally mounted on the main body by a hinge assembly.

A commonly used hinge assembly includes a pivot shaft and friction member rotatably sleeved thereon. The pivot shaft and the friction member are respectively fixed to the main body and the cover. The friction member is capable of holding any position relative to the pivot shaft because of friction created between the pivot shaft and the friction member. Thus, the cover can be opened to any angle relative to the main body, and remain therein. Generally, the friction member is integrally manufactured by bending a metallic sheet. However, it is difficult to achieve a precise dimension or desired shape for the friction member formed this way. Thus, a manufacturing cost of the friction member is relatively high. In addition, the friction member made by the metallic sheet has poor metallic strength, and is easily deformed, such that friction created between the pivot shaft and the friction member is not stable, and the cover cannot be stably opened to any angle relative to the main body. Further, friction created between the friction member and the pivot shaft cannot be adjusted to adapt to different sized device.

A second commonly used hinge assembly includes a pivot shaft, a friction member rotatably sleeved thereon, and two outer barrels sleeved on opposite ends of the friction member. The friction member includes two separate half members. Each half member includes a curved portion and two straight portions extending from opposite ends thereof. The straight portions are received in the outer barrels correspondingly. This hinge assembly may be stable and less difficult to manufacture, but friction created between the friction member and the pivot shaft still cannot be adjusted to adapt to different sized devices. Therefore, the second typical hinge assembly can only be used with collapsable electronic devices having determined sizes.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
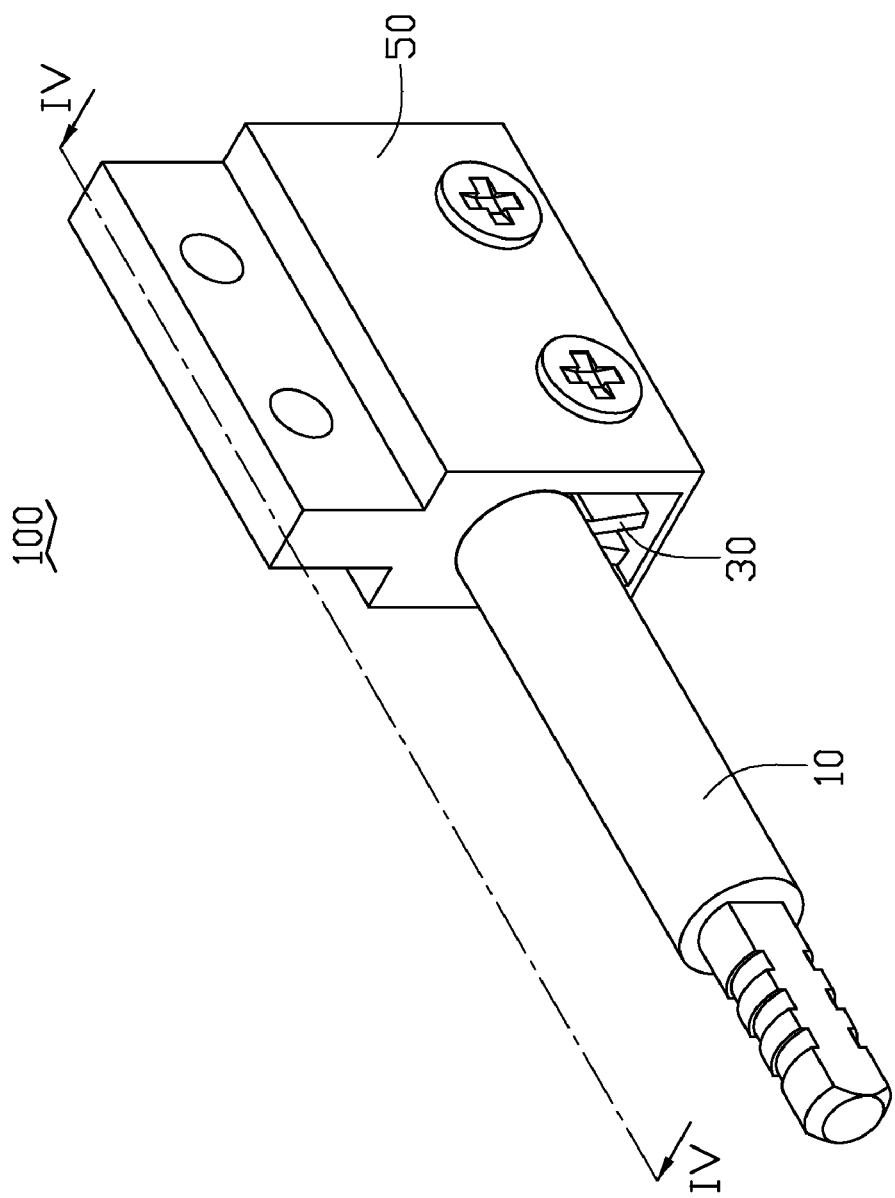
FIG. 1 is an assembled, isometric view of a hinge assembly, the hinge assembly including a support member.

Referring to FIG. 1, an exemplary embodiment of a hinge assembly 100 connects a main body and a cover of a collapsable electronic device (not shown) such as a notebook computer or mobile phone. The hinge assembly 100 includes a pivot shaft 10, a friction member 30 sleeved on the pivot shaft 10, and a support member 50 to support the pivot shaft 10 and the friction member 30.

Figure 2:
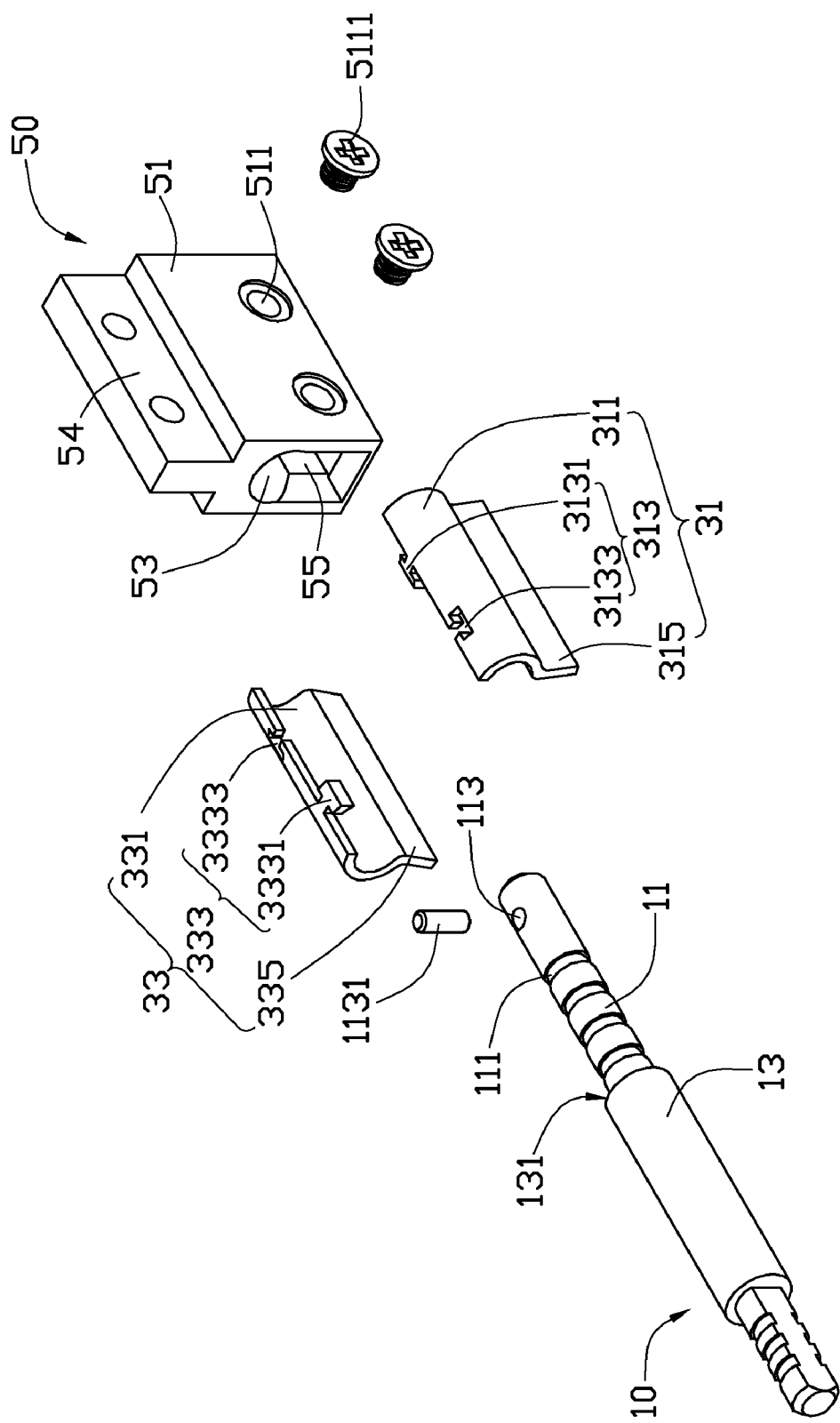
FIG. 2 is an exploded, isometric view of the hinge assembly in FIG. 1.

Referring also to FIG. 2, the pivot shaft 10 is a stepped shaft including a pivot portion 11, and a fixing portion 14, and a limiting portion 13 positioned between the pivot portion 11 and the fixing portion 14. The pivot shaft 10 defines a plurality of annular grooves 111 and a fixing hole 113 in the pivot portion 11. The annular grooves 111 can receive lubricants such as oils. The fixing hole 113 is a substantially through hole adjacent to an end of the pivot portion 11 away from the limiting portion 13. A limiting member 1131 is received in the fixing hole 113 to prevent the friction member 30 from axially moving along the pivot portion 11. In the illustrated embodiment, the limiting member 1131 is a substantially cylindrical pin. The limiting portion 13 forms a limiting surface 131 adjacent to the pivot portion 11. A transverse cross-section of the fixing portion 14 is non-circular such that the fixing portion 14 may be non-rotatably connected to the cover or main body of the collapsable electronic device.

The friction member 30 includes a first friction body 31 and a second friction member 33. A length of the friction member 30 is less than a length of the pivot portion 11 of the pivot shaft 10. The first friction body 31 includes a first curved portion 311, a first clasp portion 313 formed at an edge of a first side of the first curved portion 311, and a first extending portion 315 extending from a second side of the first curved portion 311 opposite to the first clasp portion 313. The second friction body 33 includes a second curved portion 331, a second clasp portion 333 formed at an edge of a first side of the curved portion 331, and a second extending portion 335 extending from a second side of the curved portion 331 opposite to the second clasp portion 333. The first and second curved portions 311, 331 are substantially half cylindrical barrels, thus the first and second curved portions 311, 331 cooperatively form a cylindrical barrel to tightly sleeve on the pivot portion 11 of pivot shaft 10.

The first clasp portion 313 includes a first latching block 3131 extending outwards from the edge of the first curved portion 311 along a circumferential axis and defines a first latching cutout 3133 in the first curved portion 311. The first latching cutout 3133 extends inwards from the edge of the first curved portion 311 along a circumferential axis. The second clasp portion 333 includes a second latching block 3331 extending outwards from the edge of the second curved portion 333 along a circumferential axis and defines a second latching cutout 3333 in the second curved portion 333. The second latching cutout 3333 extends inwards from the edge of the second curved portion 333 along a circumferential axis. The first and second latching blocks 3131, 3331 can be respectively latched in the first and second latching cutouts 3133, 3333 such that the first friction body 31 and the second friction body 33 are fixed to each other. In the illustrated embodiment, the first and second latching blocks 3131, 331, and the first and second latching cutouts 3133, 3333 are all substantially T-shaped.

Figure 3:
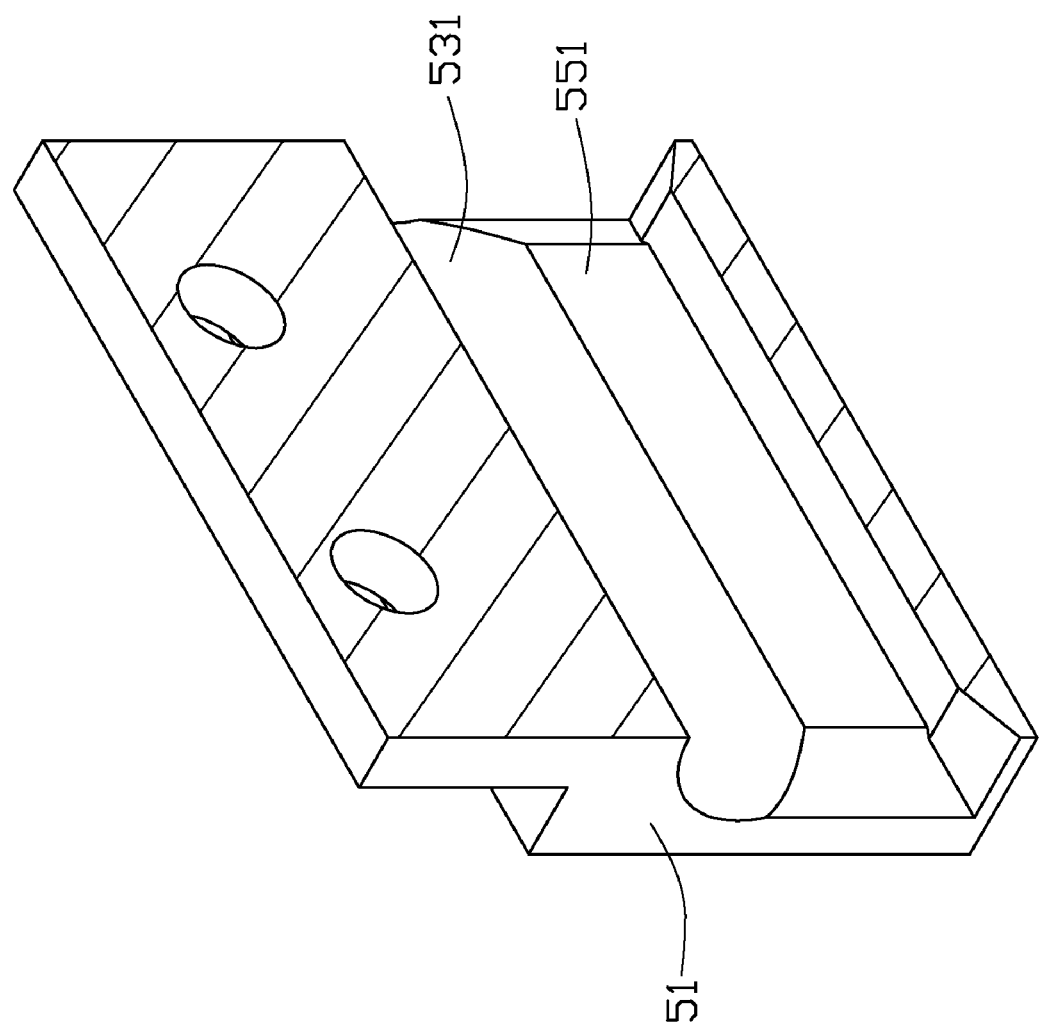
FIG. 3 is a cross-section of the support member in FIG. 1.

Referring also to FIG. 3, the support member 50 includes a housing 51, a fixing portion 54 extending from the housing 51, two adjusting members 5111, and defines a receiving chamber 53 and a latching groove 55 in the housing 51. The housing 51 includes two parallel sidewalls (not labeled). One of the sidewalls defines two adjusting holes 511 communicating with the receiving chamber 53 to receive the adjusting members 5111. The adjusting holes 511 may be threaded holes 511 and the adjusting members 5111 may be screws and can be received in the receiving chamber 53 from the adjusting holes 511. The latching groove 55 communicates with the receiving chamber 53. An inner wall 531 of the receiving chamber 53 can press the first and second curved portions 311, 331 of the friction member 30 to clamp the pivot shaft 10. An inner wall 551 of the latching groove 55 can press the first and second extending portions 315, 335 of the friction member 30 such that the first and second extending portions 315, 335 move towards each other. The fixing portion 54 is substantially a rectangular plate and may be non-rotatably connected to the other one of the cover and the main body of the collapsable electronic device. It should be pointed out that the number of adjusting members 5111 is not limited to two, and may be one or more than two, with the number of adjusting holes 511 corresponding thereto.

Figure 4:
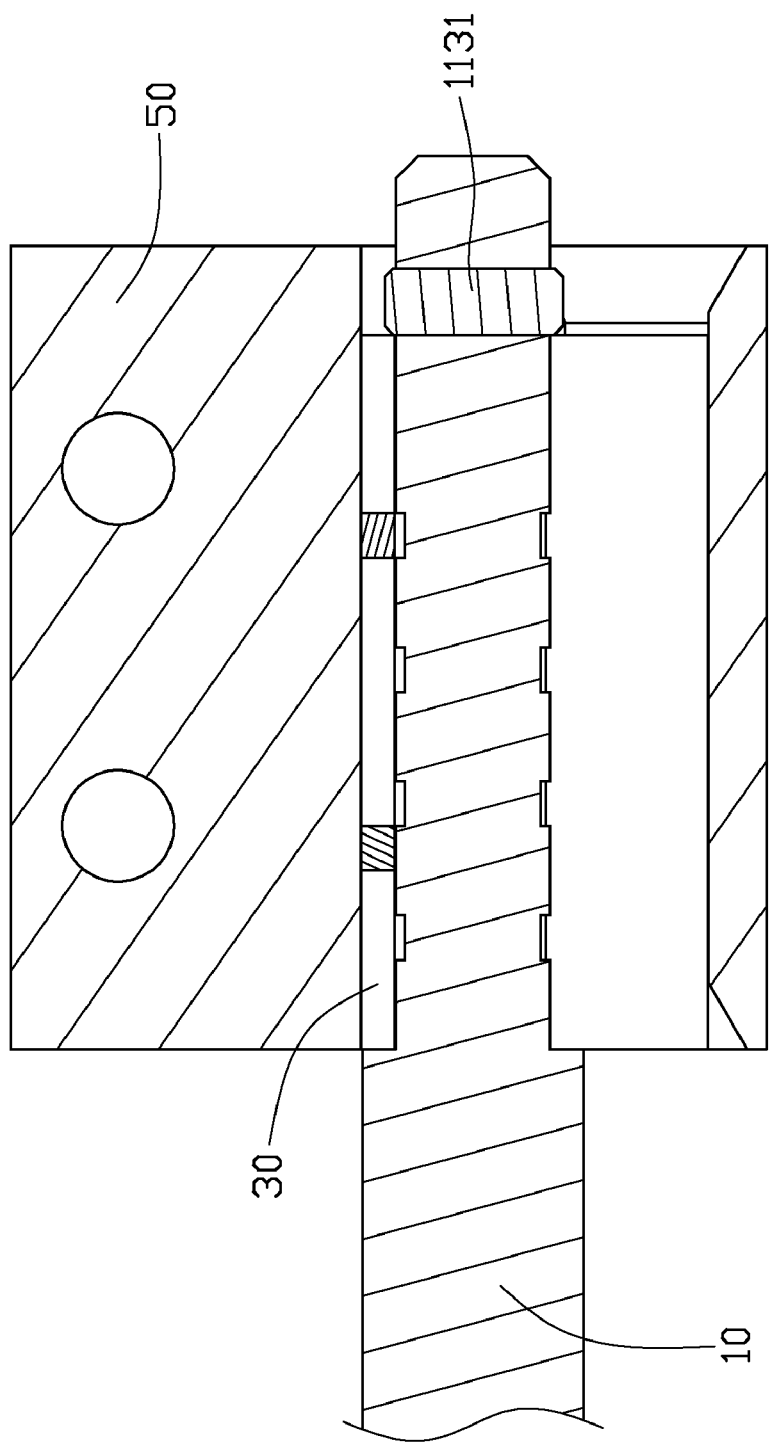
FIG. 4 is a partial, cross-section of the hinge assembly in FIG.1, taken along line IV-IV.

Referring also to FIG. 4, the hinge assembly 100 may be assembled as follows. The first friction body 31 and the second friction member 33 are attached to each other to cooperatively form the friction member 30, with the first and second latching blocks 3131, 331 latched in the first and second latching cutouts 3133, 3333 correspondingly. The friction member 30 is sleeved on the pivot portion 11 of the pivot shaft 10 and a first end of the friction member 30 abuts the limiting surface 131 of the limiting portion 11. Since the length of the friction member 30 is less than the length of the pivot portion 11 of the pivot shaft 10, thus after the friction member 30 is sleeved on the pivot portion 11, the end of the pivot portion 11 that defines the fixing hole 113, extends out of the friction member 30. The limiting member 1131 is received in the fixing hole 113. A second end of the friction member 30, opposite to the first end, abuts the limiting member 1131. The friction member 30 is prevented from moving along the axial direction of the pivot shaft 10 by the limiting surface 131 of the limiting portion 13 and the limiting member 1131. The friction member 30 together with the pivot portion 11 of the pivot shaft 10 is received in the support member 50 such that the first and second curved portions 311, 331 of the friction member 30 contact the inner wall 531 of the receiving chamber 53 and the first and second extending portions 315, 335 of the friction member 30 contact the inner wall 551 of the latching groove 55. The adjusting members 5111 are received in the adjusting holes 511 to abut the extending portion 315 of the first friction body 31.

When the hinge assembly 100 is applied in a collapsable electronic device, the fixing portions 14 of the pivot shaft 10 and the support member 50 are correspondingly connected to the main body and the cover of the collapsable electronic device.

Since the sidewalls of the housing 51 clamp the friction member 30 from opposite sides, according to the lever principle, the first clasp portion 313 is a fulcrum of the first friction body 31, and the second clasp portion 333 is a fulcrum of the second friction body 33. Thus, the first friction body 31 and the second friction body 33 cooperatively clamp the pivot portion 11 of the pivot shaft 10, with the first and second curved portions 311, 331 of the friction member 30 tightly contacting the pivot portion 11. Therefore, a contact area between the pivot shaft 10 and the friction member 30 is relatively large so that friction created between the pivot shaft 10 and the friction member 30 is relatively strong and stable. In addition, a pressing force applied on the extending portion 315 of the first friction body 31 can be adjusted by tightening or loosening the adjusting members 5111, thus friction between the pivot shaft 10 and the friction member 30 can be conveniently adjusted to adapt to collapsable electronic devices of different sizes.

It should be pointed out that, the limiting member 1131 may be a screw, and accordingly, the fixing hole 113 is a threaded hole. The first and second extending portions 315, 335 of the friction member 30 may be omitted, and the adjusting members 5111 directly contact one of the first and second curved portions 311, 331 of the friction member 30. The adjusting holes 511 may also defined in both sidewalls of the housing 51, thus contacting both the first and second extending portions 315, 335 of the friction member 30.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A hinge assembly, comprising:
a pivot shaft comprising a pivot portion;
a friction member sleeved on the pivot portion, comprising a first friction body and a second friction body attached to the first friction body;
a support member comprising a housing, and defining a receiving chamber in the housing and at least one adjusting hole communicating with the receiving chamber, the friction member and the pivot portion of the pivot shaft being received in the chamber, and an inner wall of the receiving chamber pressing the friction member to clamp the pivot portion; and
at least one adjusting member received in the at least one adjusting hole to abut the friction member such that friction created between the friction member and the pivot portion is adjusted;
wherein the first friction body comprises a first curved portion, the second friction body comprises a second curved portion, and the first and second curved portions are substantially half cylindrical barrels so as to cooperatively form a cylindrical barrel tightly sleeved on the pivot portion; the first friction body further comprises a first clasp portion formed at an edge of a first side of the first curved portion, and the second friction body comprises a second clasp portion formed at an edge of a first side of the curved portion, the first clasp portion is latched to the second clasp portion.

2. The hinge assembly of claim 1, wherein the first clasp portion comprises a first latching block extending outwards from the edge of the first curved portion along a circumferential axis and defines a first latching cutout in the first curved portion; the second clasp portion comprises a second latching block extending outwards from the edge of the second curved portion along a circumferential axis and defines a second latching cutout defined in the second curved portion; the first and second latching blocks are latched in the first and second latching cutouts correspondingly.

3. The hinge assembly of claim 2, wherein the first and second latching blocks, the first and second latching cutouts are all substantially T-shaped.

4. The hinge assembly of claim 1, wherein the first friction body further comprises a first extending portion extending from a second side of the first curved portion opposite to the first clasp portion, the second friction body comprises a second extending portion extending from a second side of the curved portion opposite to the second clasp portion; the support member further defines a latching groove in the housing communicating with the receiving chamber, and the first and second extending portions are received in the latching groove; wherein the at least one adjusting member abuts the first extending portion of the first friction body.

5. The hinge assembly of claim 1, wherein the at least one adjusting member is a screw and the at least one adjusting hole is a threaded hole.

6. The hinge assembly of claim 1, wherein the pivot shaft is a stepped shaft and further comprises a limiting portion connected to the pivot portion, the limiting portion forming a limiting surface adjacent to the pivot portion, and a first end of the friction member abuts the limiting surface of the limiting portion.

7. The hinge assembly of claim 6, wherein the pivot shaft defines a fixing hole adjacent to an end of the pivot portion away from the limiting portion; the hinge assembly further comprises a limiting member received in the fixing hole to abut and prevent the friction member from axially moving along the pivot portion.

8. The hinge assembly of claim 1, wherein the pivot shaft defines a plurality of annular grooves in the pivot portion.

9. A collapsable electronic device, comprising:
a main body;
a cover; and
a hinge assembly connecting the main body and the cover, the hinge assembly comprising:
  a pivot shaft non-rotatably connected to one of the main body and the cover, the pivot shaft comprising a pivot portion;
  a friction member sleeved on the pivot portion, the friction member comprising a first friction body and a second friction body attached to the first friction body;
  a support member non-rotatably connected to the other one of the main body and the cover, the support member comprising a housing and defining a receiving chamber in the housing and two adjusting holes communicating with the receiving chamber, the friction member and the pivot portion of the pivot shaft being received in the chamber, and an inner wall of the receiving chamber pressing the friction member to clamp the pivot portion; and
  two adjusting members received in the adjusting holes to abut the friction member such that friction created between the friction member and the pivot portion is adjusted;
  wherein the first friction body comprises a first curved portion, the second friction body comprises a second curved portion, and the first and second curved portions are substantially half cylindrical barrels so as to cooperatively form a cylindrical barrel tightly sleeved on the pivot portion; the first friction body further comprises a first clasp portion formed at an edge of a first side of the first curved portion, and the second friction body comprises a second clasp portion formed at an edge of a first side of the curved portion, the first clasp portion is latched to the second clasp portion.

10. The collapsable electronic device of claim 9, wherein the first clasp portion comprises a first latching block extending outwards from the edge of the first curved portion along a circumferential axis and defines a first latching cutout in the first curved portion; the second clasp portion comprises a second latching block extending outwards from the edge of the second curved portion along a circumferential axis and defines a second latching cutout in the second curved portion; the first and second latching blocks are latched in the first and second latching cutouts correspondingly.

11. The collapsable electronic device of claim 10, wherein the first and second latching blocks and the first and second latching cutouts are all substantially T-shaped.

12. The collapsable electronic device of claim 9, wherein the first friction body further comprises a first extending portion extending from a second side of the first curved portion opposite to the first clasp portion, the second friction body comprises a second extending portion extending from a second side of the curved portion opposite to the second clasp portion; the support member further defines latching groove in the housing communicates with the receiving chamber, and the first and second extending portions are received in the latching groove; the adjusting members abut the first extending portion of the first friction body.

13. The collapsable electronic device of claim 9, wherein the adjusting members are screws and the adjusting holes are threaded holes.

14. The collapsable electronic device of claim 9, wherein the pivot shaft is a stepped shaft and further comprises a limiting portion connected to the pivot portion, the limiting portion forming a limiting surface adjacent to the pivot portion, and a first end of the friction member abuts the limiting surface of the limiting portion.

15. The collapsable electronic device of claim 14, wherein the pivot shaft defines a fixing hole adjacent to an end of the pivot portion away from the limiting portion; and the hinge assembly further comprises a limiting member received in the fixing hole to abut and prevent the friction member from axially moving along the pivot portion.

16. The collapsable electronic device of claim 9, wherein the pivot shaft defines a plurality of annular grooves in the pivot portion.

17. A hinge assembly, comprising:
a pivot shaft comprising a pivot portion;
a friction member sleeved on the pivot portion, comprising a first friction body and a second friction body latched to the first friction body, wherein the first friction body comprises a first curved portion, the second friction body comprises a second curved portion; and the first and second curved portions are substantially half cylindrical barrels so as to cooperatively form a cylindrical barrel tightly sleeved on the pivot portion; the first friction body further comprises a first clasp portion formed at an edge of a first side of the first curved portion, and the second friction body comprises a second clasp portion formed at an edge of a first side of the second curved portion, the first clasp portion is latched to the second clasp portion;
a support member comprising a housing, and defining a receiving chamber in the housing and at least one adjusting hole communicating with the receiving chamber, the friction member and the pivot portion of the pivot shaft being received in the chamber, and an inner wall of the receiving chamber pressing the friction member to clamp the pivot portion; and
at least one adjusting member received in the at least one adjusting hole to resist the friction member such that friction created between the friction member and the pivot portion is adjusted.

18. The hinge assembly of claim 17, wherein the first friction body further comprises a first extending portion extending from a second side of the first curved portion opposite to the first clasp portion, and the second friction body comprises a second extending portion extending from a second side of the second curved portion opposite to the second clasp portion, the first extending portion is attached to the second extending portion; the at least one adjusting member resists the first extending portion.

* * * * *